AUTOMATIC DATA CORRECTION FOR BATCH-FABRICATED MEMORIES

Filed Feb. 25, 1964

13 Sheets-Sheet 1

| CONDITION | CHAR. 1 | CHAR. 2 | CHAR. 3 | CHAR. 4 | CHAR. 5 | CHAR. 6 | CHAR. 7 | CHAR. 8 |
|---|---|---|---|---|---|---|---|---|
| A | NO BAD CHARACTERS | | | | | | | |
| B | BAD | $I_R$ | Y ADDRESS | X ADDRESS | | | | |
| C | | BAD | $I_R$ | Y ADDRESS | X ADDRESS | | | |
| D | | | BAD | $I_R$ | Y ADDRESS | X ADDRESS | | |
| E | | | | BAD | $I_R$ | Y ADDRESS | X ADDRESS | |
| F | | | | | BAD | $I_R$ | Y ADDRESS | X ADDRESS |
| G | | | Y ADDRESS | X ADDRESS | $I_L$ | BAD | | |
| H | | | | Y ADDRESS | X ADDRESS | $I_L$ | BAD | |
| I | | | | | Y ADDRESS | X ADDRESS | $I_L$ | BAD |
| J | BAD | BAD | $I_R$ | Y ADDRESS | X ADDRESS | | | |
| K | | BAD | BAD | $I_R$ | Y ADDRESS | X ADDRESS | | |
| L | | | BAD | BAD | $I_R$ | Y ADDRESS | X ADDRESS | |
| M | | | | BAD | BAD | $I_R$ | Y ADDRESS | X ADDRESS |
| N | | Y ADDRESS | X ADDRESS | $I_L$ | BAD | BAD | | |
| O | | | Y ADDRESS | X ADDRESS | $I_L$ | BAD | BAD | |
| P | | | | Y ADDRESS | X ADDRESS | $I_L$ | BAD | BAD |

FIG. 1

INVENTOR
REX RICE
BY
ATTORNEY

Oct. 31, 1967 R. RICE 3,350,690

AUTOMATIC DATA CORRECTION FOR BATCH-FABRICATED MEMORIES

Filed Feb. 25, 1964 13 Sheets-Sheet 2

Oct. 31, 1967 R. RICE 3,350,690

AUTOMATIC DATA CORRECTION FOR BATCH-FABRICATED MEMORIES

Filed Feb. 25, 1964

13 Sheets-Sheet 3

MAIN MEMORY DATA REGISTER

Oct. 31, 1967 R. RICE 3,350,690

AUTOMATIC DATA CORRECTION FOR BATCH-FABRICATED MEMORIES

Filed Feb. 25, 1964

13 Sheets-Sheet 8

Oct. 31, 1967

R. RICE 3,350,690

AUTOMATIC DATA CORRECTION FOR BATCH-FABRICATED MEMORIES

Filed Feb. 25, 1964

United States Patent Office 3,350,690
Patented Oct. 31, 1967

3,350,690

AUTOMATIC DATA CORRECTION FOR BATCH-FABRICATED MEMORIES

Rex Rice, Menlo Park, Calif., assignor to International Business Machines Corporation, New York, N.Y., a corporation of New York Filed Feb. 25, 1964, Ser. No. 347,206
4 Claims. (Cl. 340—172.5)

ABSTRACT OF THE DISCLOSURE

A large-capacity prefabricated memory, because of its high cost of manufacture, must be useable despite the presence of permanently bad bit positions in the word registers of such prefabricated memory.

When factory diagnostic-tested memories have been shown to contain either a single bad character because of one or more permanently defective bad bits, the bad-character-containing word is modified by placing an indicator character adjacent one bad character or adjacent two consecutive bad characters. Such indicators are placed either to the left or right of the permanently bad character(s), such location being determined if there is space in the partially defective word for inserting the indicator. Two additional characters are placed adjacent the indicator character to indicate the address of a location in an auxiliary memory which contains either the four characters (in the case of a single bad character) or the five characters (in the case of two adjacent characters) which must be stored in the auxiliary memory.

During the READ portion of a memory cycle, a main memory word is tested for either a right indicator [$I_R$—indicator appearing to the right of the bad character] or a left indicator $I_L$. If no indicator is present, the normal memory cycle takes place. If an indicator is present, the normal memory cycle is interrupted and an intermediate routine takes place during which the auxiliary memory is brought into use. During this intermediate routine, the partially defective word is further examined to determine (1) whether it contains an $I_R$ or an $I_L$ character as well as to determine if there are one or two adjacent bad characters in such partially defective word. When the examination discloses the type of error that exists, an auxiliary memory supplies corrected characters either in read-out or write-in registers, said corrected characters substituting for (1) a permanently defective character or two adjacent permanently defective characters, (2) the indicator character and (3) the characters employed as an address in the auxiliary memory where the correct substitutable characters are located. The final word that is used for writing or reading will comprise the good characters of a partially defective word dovetailed with the substitutable characters maintained in an auxiliary memory.

This invention relates to data memories and more particularly to a data memory system designed to reliably operate even though certain of the memory system's storage devices are defective.

In the prior art construction of large memories, particularly where magnetic ferrite cores are used as storage cells for individual bits of information, 100% reliability is made possible by testing each core before, during and after assembly into arrays so as to eliminate defective cores. This step by step process results in a high storage cost per bit and places the total cost of bulk storage beyond an economically reasonable amount. Consequently, the trend is towards batch fabrication of memories.

However, when batch fabrication of memories is employed, it is almost impossible to obtain a memory wherein every bit of such memory is reliable. Moreover, when batch fabrication of a memory is relied upon, replacement or repair of the individually bad bits is untenable and in many cases impossible. Since it would be very expensive to replace an entire memory because of a relatively few bad bits therein, some scheme must be devised to employ memories in a computer despite the presence of unswitchable or permanently bad bits in such memory.

In a prior filed application entitled, "Memory System for Using a Memory Despite the Presence of Defective Bits Therein," by applicant and filed Sept. 18, 1961, having the Serial No. 138,644 now Patent No. 3,222,653 and assigned to the same assignee as the instant application, numerous techniques were described and claimed for operating a mass produced memory despite the presence of defective bits in such memory. In such previously filed application means were shown for storing the address of an auxiliary memory location within a section of the defective memory location itself if there was room for such storage in the defective memory location. The defective memory location is tagged and, when the latter is read out, the computer which employs such defective memory location can immediately go to the address, stored in the defective memory, to fetch a corrected word from an auxiliary memory. Such previously filed application had means for storing both the address of a defective memory location and the address of an auxiliary memory location storing the corrected word in a matching register. During subsequent read out of the defective memory location, the content of such matching register was compared with a standard register in order to find a location in an auxiliary memory that contained a word substitutable for the defective word in memory.

The present invention is an improvement on such previously filed invention. In the present application, it is assumed that a test run will be made initially on the prefabricated memory made by a batch fabrication method in order to determine which bits are unswitchable or permanently bad. When it has been discovered that certain bits of a word are bad, all the bits of a character located adjacent to the bad word are set to a predetermined same state, such grouping of bits in the same state serving as a code to identify an adjacent bad character. Assuming that a character contains eight bits, then eight "1's" will precede or follow a bad character. Two characters, or sixteen bits, will be placed in the register to the right of the bad character and the latter two characters will contain the address of the two characters of missing data. The two characters that contain the address of the missing data in an auxiliary memory location may also contain a code which will indicate whether the indicating character which contains all "1's" is to the right or to the left of the bad character. This feature will be described in greater detail hereinafter but attention is brought to the fact that, when a word is scanned, the bad bits may occur at the beginning of a word so that there is no room to put the address characters to the left of the bad character. Likewise, when the bad character is located to the right of the word being scanned, there will then be no room for the address characters to be placed to the right of such bad character. In order to obtain versatility, a code is placed in the characters storing the address of a corrected word so that it becomes immaterial which portion of a word has defective bits therein.

The present invention is an improvement over the previously filed application Ser. No. 138,644 now Patent No. 3,222,653, in that the register that is defective actually houses the address of an auxiliary memory wherein the corrected word is located. Thus, means are provided to replace only a portion of a defective word rather than replace the entire word. Assuming that a word consists of fifty characters, and only one or two characters are defective, then one character can be used to describe the presence of a defective character or two adjacent defective characters and two characters can be employed to hold the address of the corrected characters needed to make the defective word useable. Thus only four or five characters are needed to be replaced rather than all fifty characters should there be one or two defective characters in the batch produced memory word.

Consequently, it is an object of this invention to provide means for employing a large memory despite the presence of permanently defective bits therein.

Yet another object is to employ means for correcting bits and/or defective characters in words without replacing such defective words in their entirety.

Yet another object is to efficiently store the address of the correct information within the very register that is defective.

A further object is to provide means for correcting defective characters in words without replacing each defective word in its entirety, yet not interfere with the normal operation of the read-write memory cycle if no defective characters are present.

The foregoing and other objects, features and advantages of the invention will be apparent from the following more particular description of preferred embodiments of the invention as illustrated in the accompanying drawings.

In the drawings:

FIGURE 1 is a chart showing positions that bad characters and their accompanying addresses can occupy in a single memory word.

Figure 2:
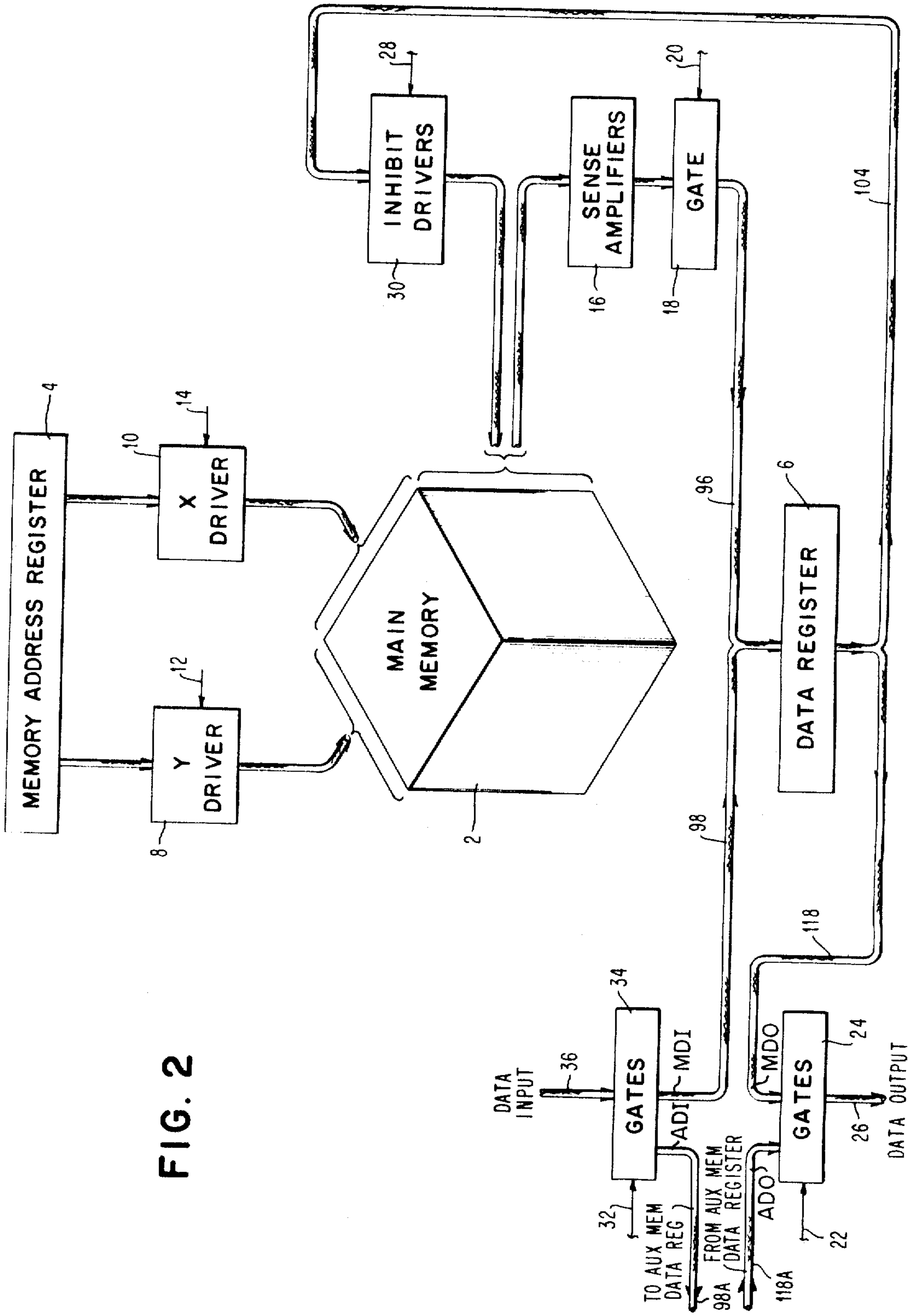
FIGURE 2 is a diagrammatic view of a conventional 3-dimensional memory.
Figure 3:
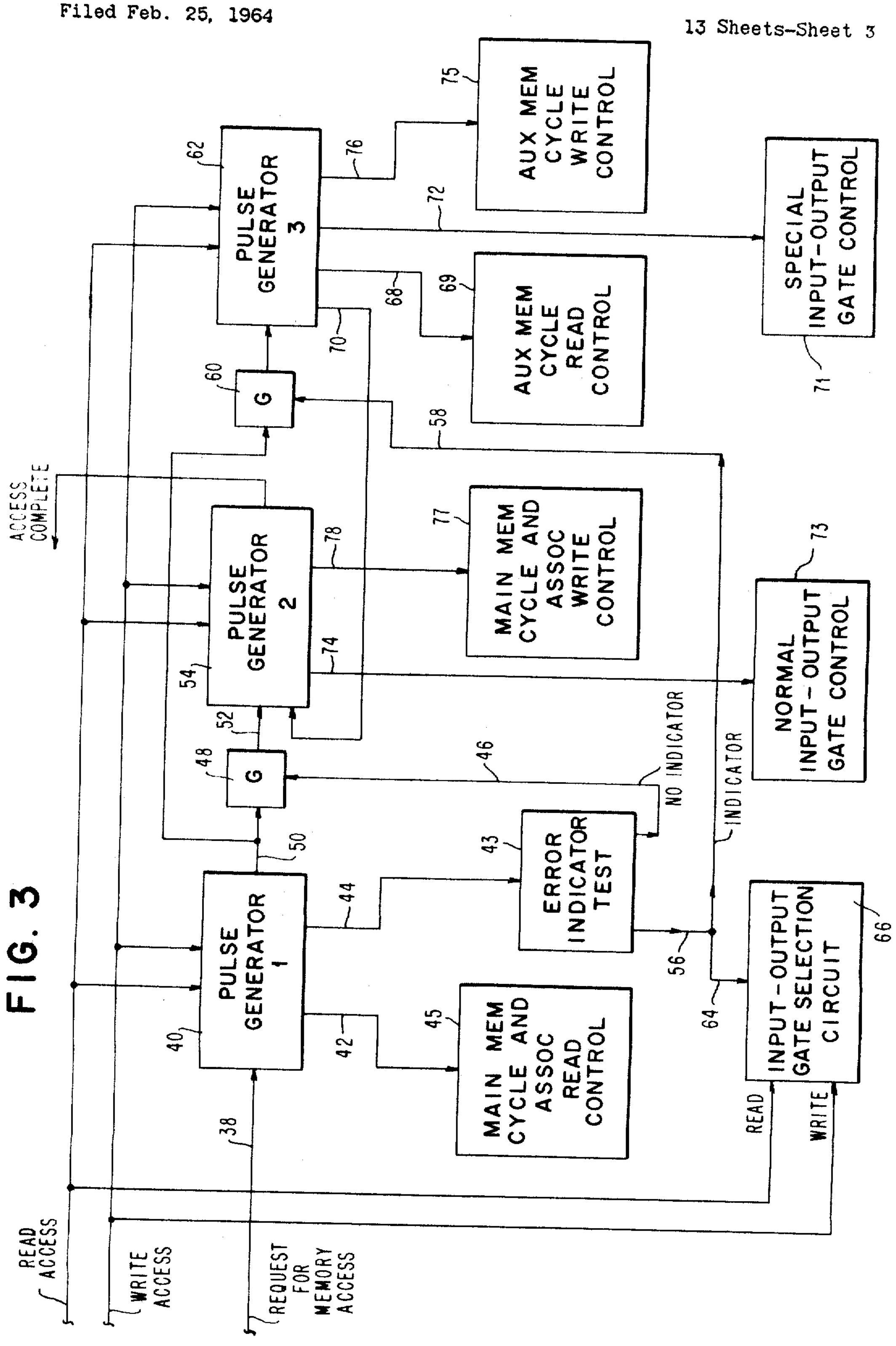
FIGURE 3 is a block diagram which shows the sequence of operations for carrying out the corrected read-write memory cycles.
Figure 4A:
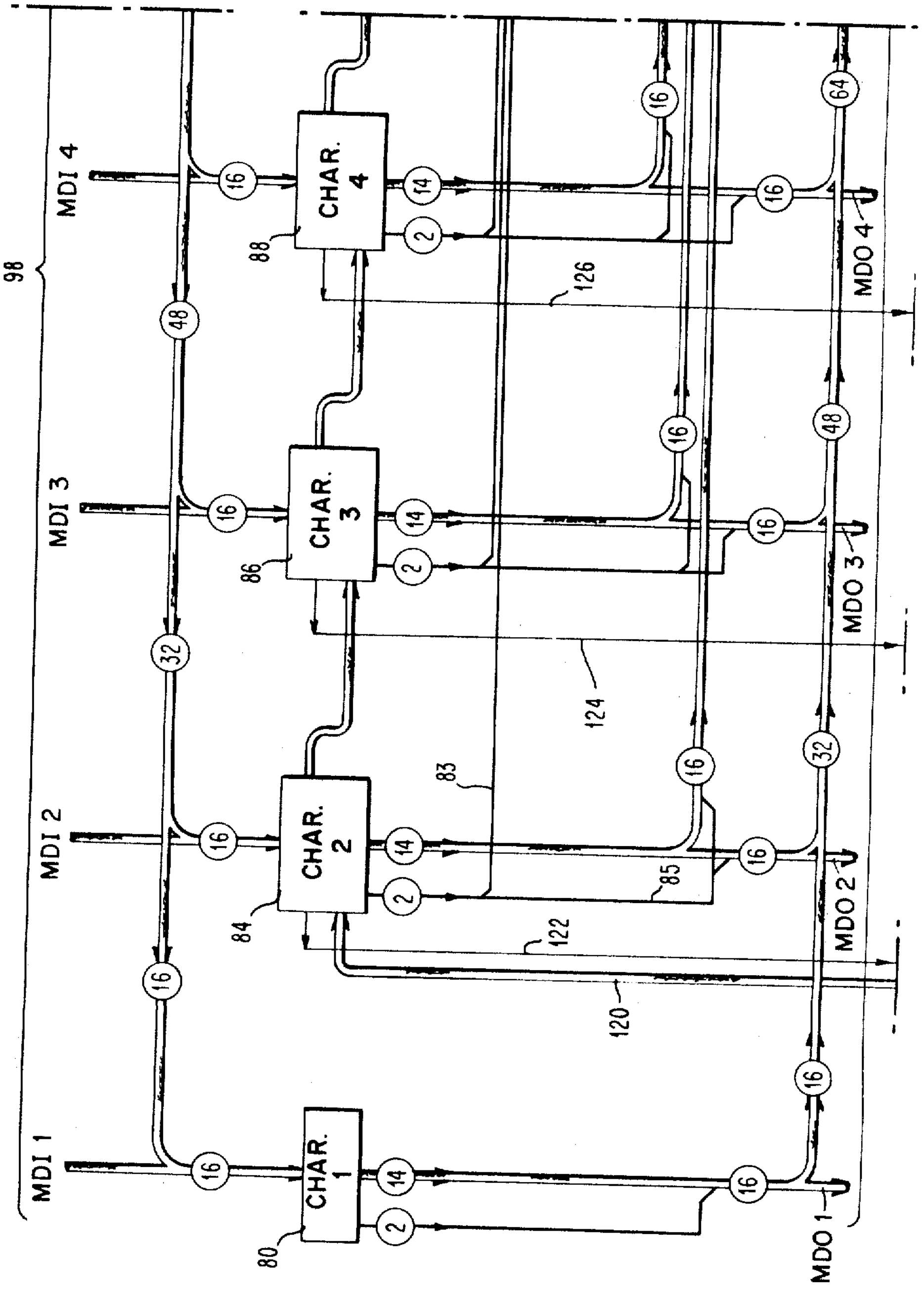
Figure 4:
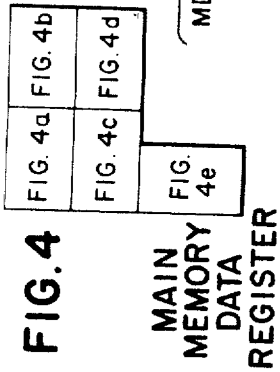
Figure 4B:
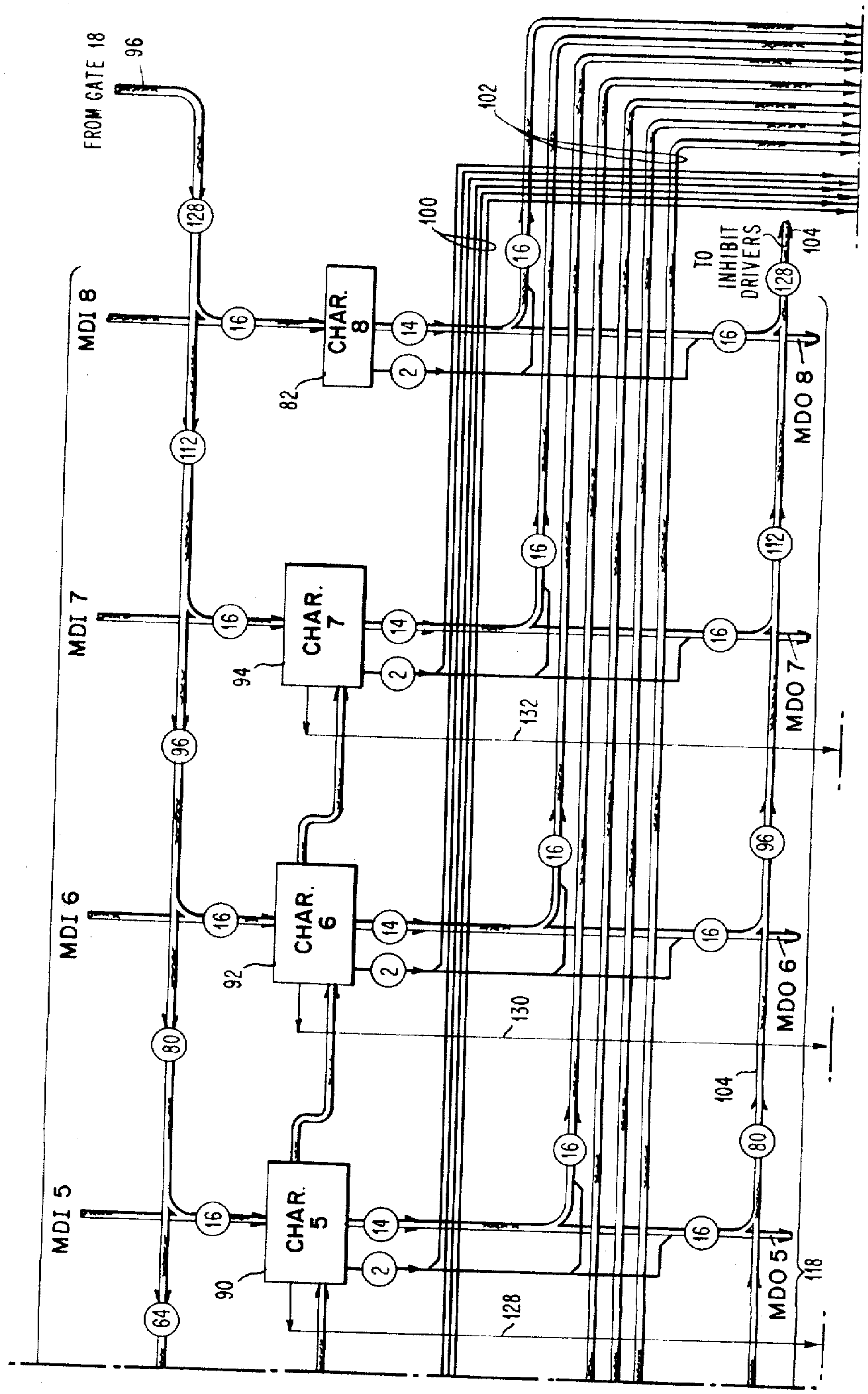
Figure 4C:
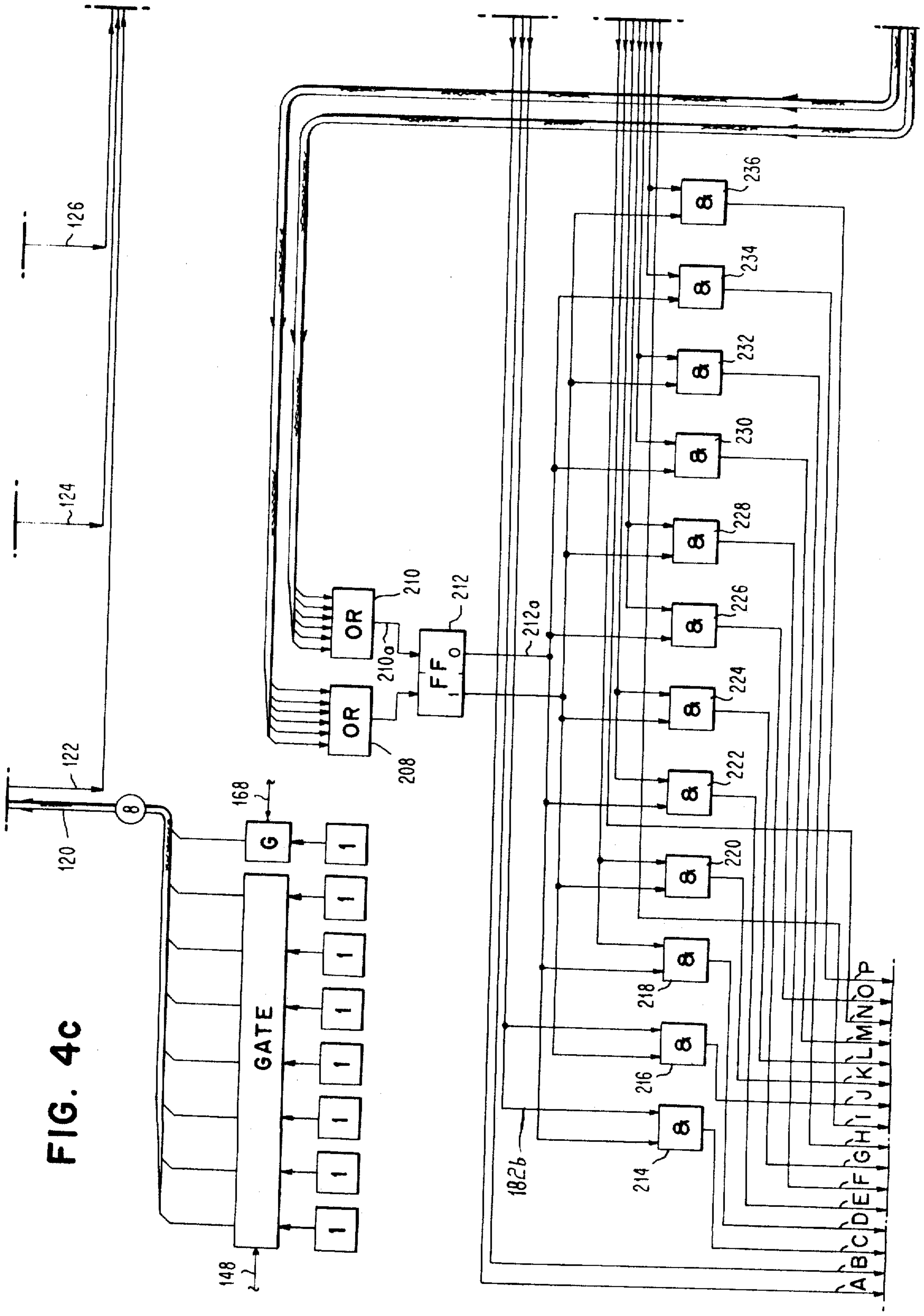
Figure 4D:
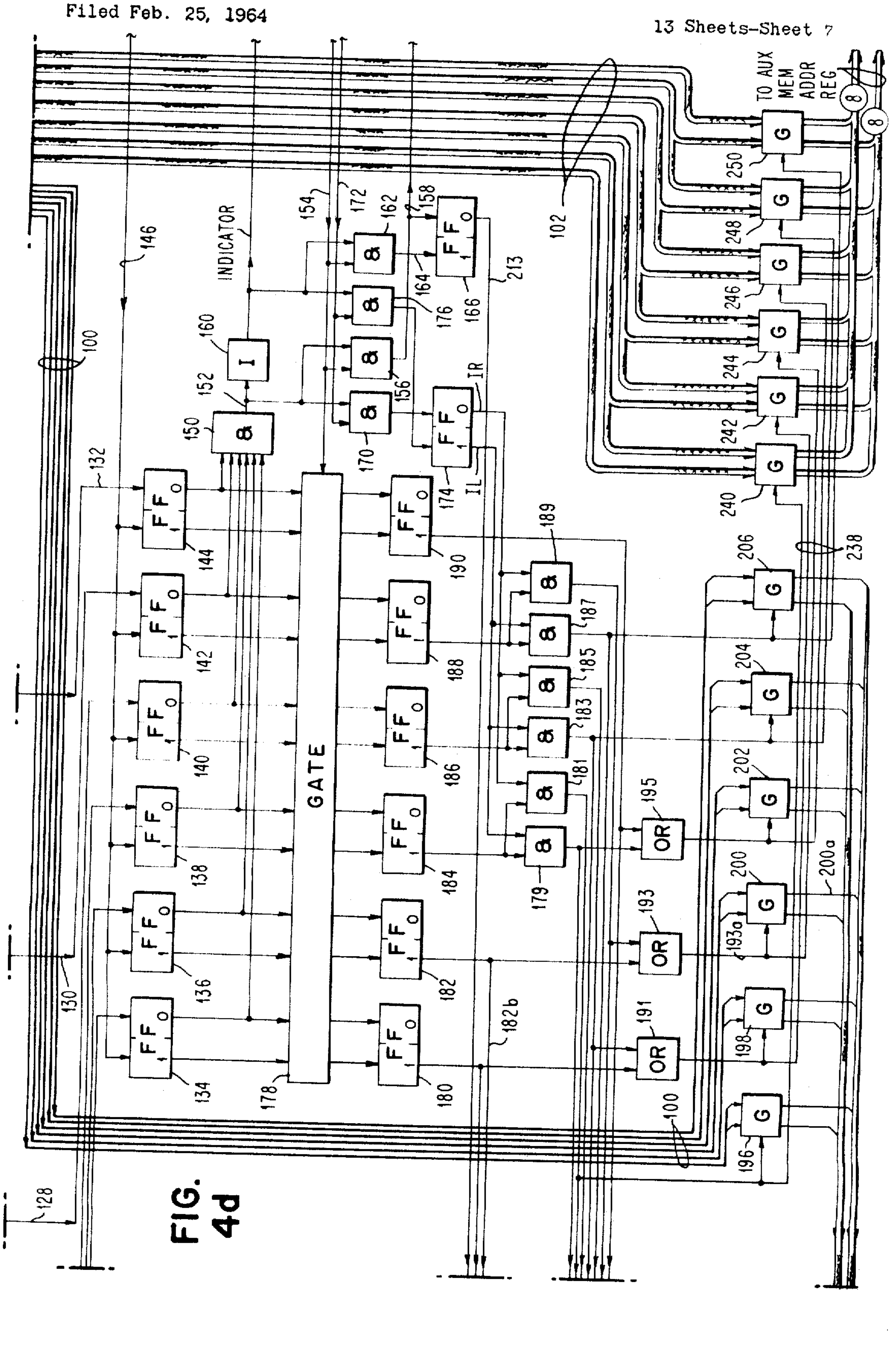
Figure 4E:
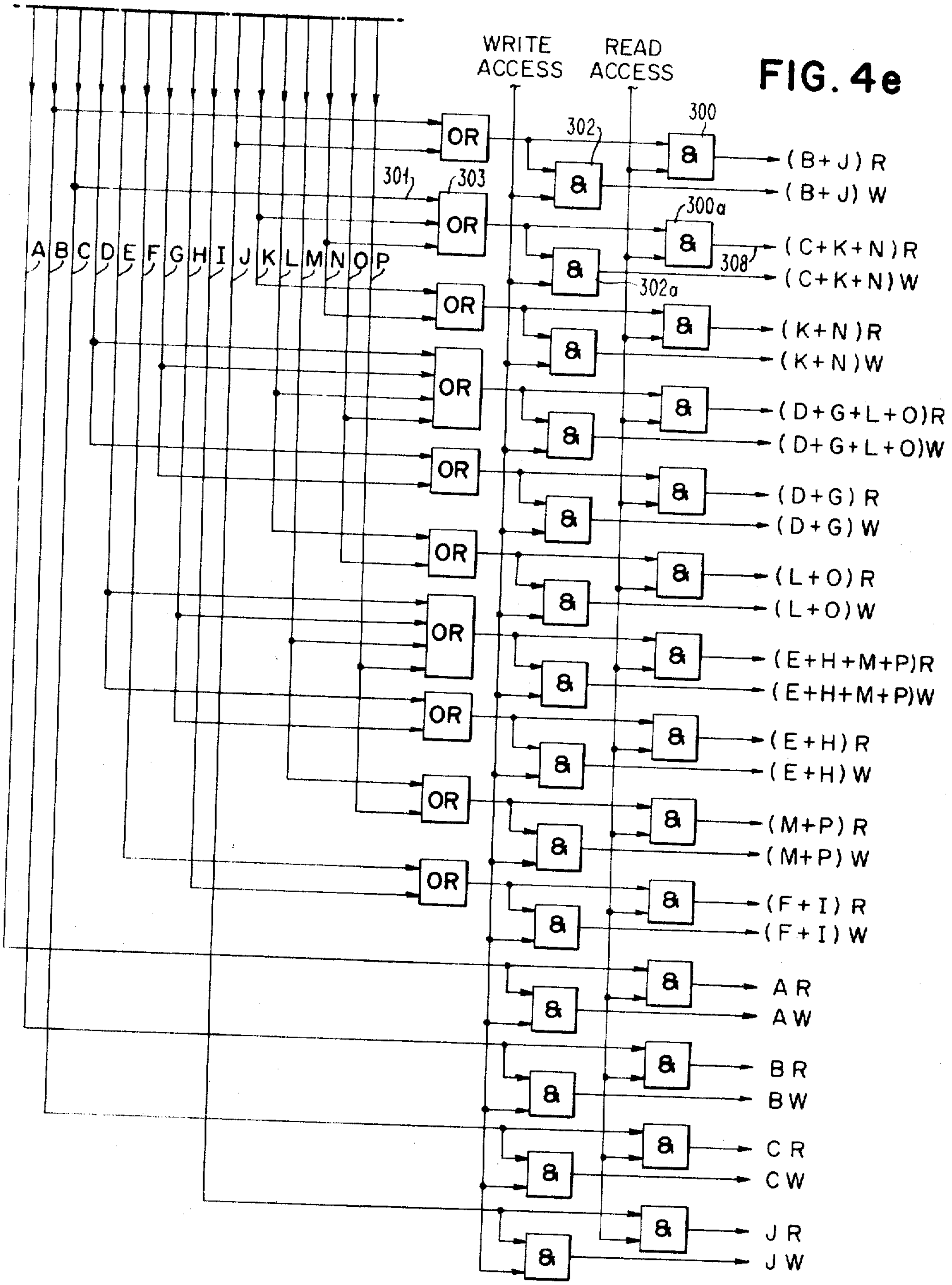

FIGURES 4*a* and 4*b* are a more detailed showing of the data register of the main memory of FIGURE 2; FIGURES 4*c*, 4*d* and 4*e* are logic diagrams that carry out certain of the logic employed in FIGURE 3; FIGURE 4 indicates how FIGURES 4*a* to 4*e* are to be assembled.

Figure 5:
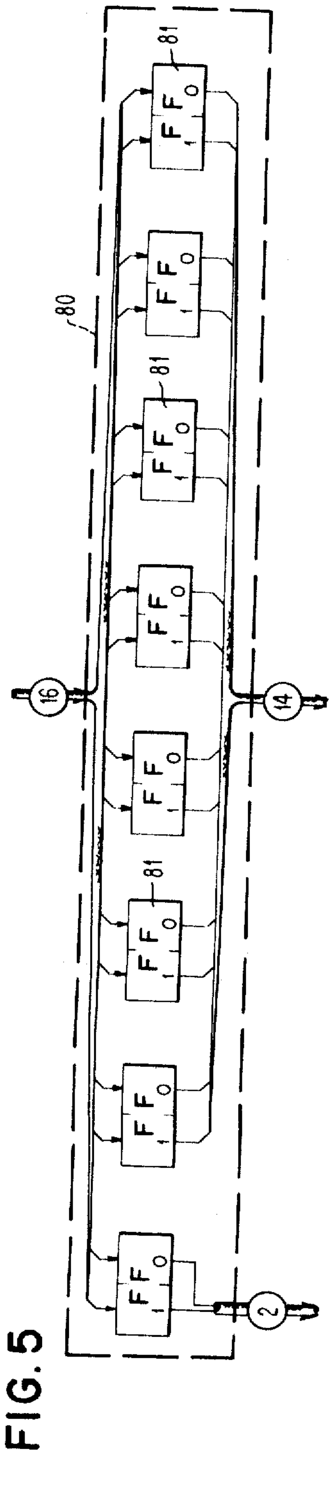

FIGURE 5 is a detailed showing of the block 80 of FIGURE 4*a*.

Figure 6:
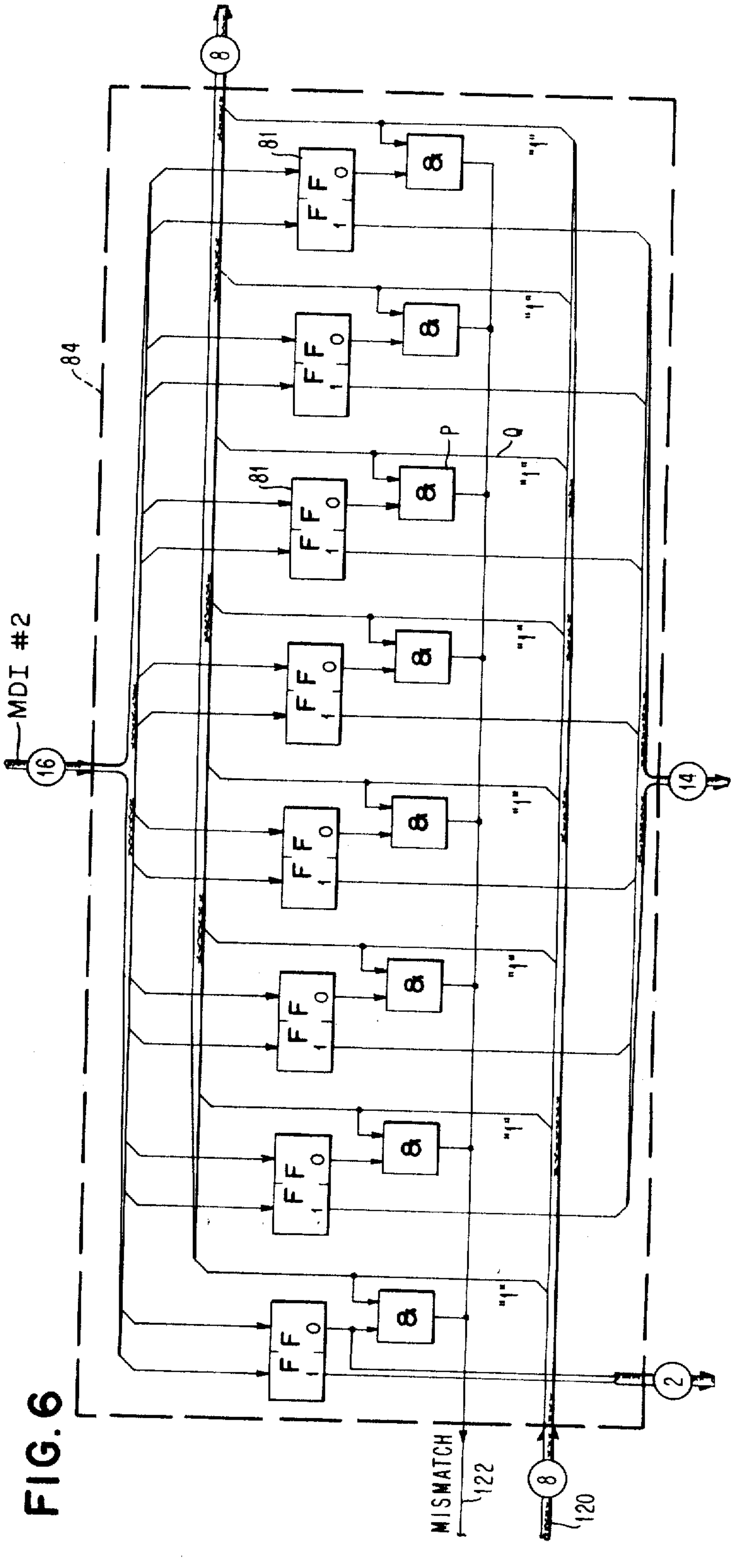

FIGURE 6 is a logic diagram of the matching circuit employed in the present invention.

Figure 7:
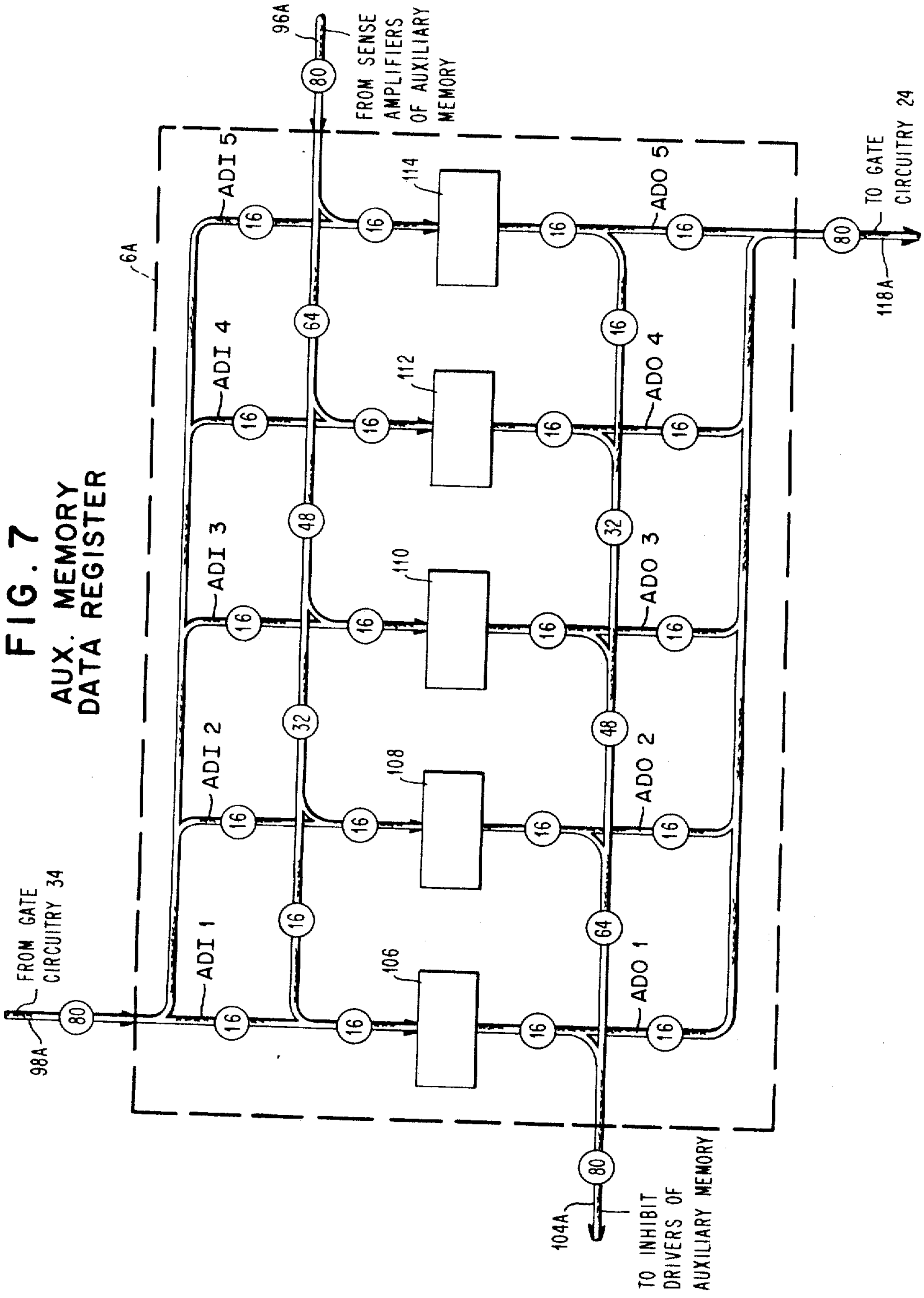
Figure 8:
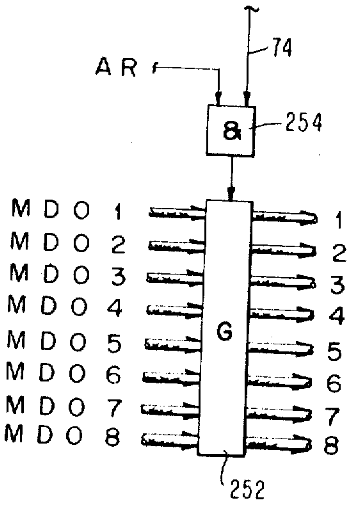
Figure 9:
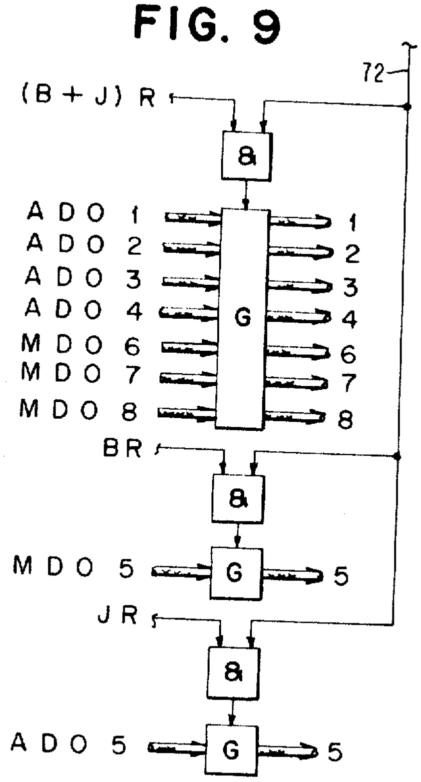

FIGURE 7 is a showing of a data register employed in the proposed auxiliary memory of the present invention.

FIGURES 8, 9, 10 and 11 are logic diagrams relating to the switching of output data, during a read access, from the Main and Auxiliary Data Registers to the data output lines.

FIGURES 12, 13, 14 and 15 are logic diagrams relating the switching of input data, during a write access, from data input lines to the Main and Auxiliary Data Registers.

In illustrating the invention, an eight character memory word is assumed and each memory word can contain a single bad character in any one of the positions 1–8 inclusive. The scheme for using a memory with permanently defective bits will allow for the correction of a memory word having a single bad character or two adjacent bad characters. If the memory word contains two non-adjacent bad characters or more than two adjacent bad characters, then some other method of error correction must be used.

Bad character positions of the batch fabricated memory are detected by a diagnostic test performed by the manufacturer before the machine is shipped and an indicator, which is a special character, is placed either immediately to the right of the bad position or immediately to the left of the bad position. In this embodiment, the indicator which is placed at the right of a bad position is abbreviated $I_R$ and the indicator which is placed at the left of a bad position is abbreviated $I_L$. The $I_R$ indicator is represented by the binary designation 11111110 and the $I_L$ by the binary designation 11111111. These special characters cannot be used to represent data elsewhere in the batch fabricated memory, hereinafter referred to as the Main Memory. FIGURE 1 shows all the possible positions that single bad characters or two adjacent bad characters can occupy in a single memory word. There are fifteen possible configuration of memory words which include bad characters, such configurations identified as conditions B to P. Immediately to the right of the indicator $I_R$ is a two-character address which is the address of a location in an Auxiliary Memory which contains the four characters (in the case of a single bad character) or the five characters (in the case of two adjacent bad characters) which must be stored in the Auxiliary Memory. Such addresses can also be assigned by the manufacturer. The high order bit in the Y address character is always "0" if there is a single bad character and is always a "1" if there are two adjacent bad characters. This means that half of the Auxiliary Memory can be used to store four character words and the other half can be used to store five character words. The high order bit of the Y address will condition the appropriate half of the Auxiliary Memory.

It is understood that the Main Memory referred to herein would be one that has a very high bit capacity and is fabricated so that bad bits are not individually removable. If bad bits occur, and it is expected that there will be a certain percentage of the total number of bits that become unswitchable during the manufacturing process, then means must be found to be able to use the Main Memory with its inherently bad crop of bits. The Auxiliary Memory of this system would be a conventional core memory or other memory whose elements are of the highest reliability. In other words, no imperfect cores would be tolerated in the Auxiliary Memory. FIGURE 2 is a diagrammatic view of a conventional Main Memory system. The main storage (in this invention would consist of a batch fabricated memory) or Main Memory is indicated by the reference character 2, the Memory Address Register by the reference character 4, and the Data Register is indicated by the reference character 6. Memories of this type require a memory cycle, the first portion of which is known as the "read" portion and the second portion of which is referred to as the "write" portion.

STANDARD MEMORY—CHART 1

| |
|---|
| Read Access |
| Read memory word into Data Register. |
| ↓ |
| Gate Data Register to output lines. |
| ↓ |
| Write Data Register back to memory. |
| Write Access |
| Read memory word into Data Register. |
| ↓ |
| Gate Input Data to Data Register. |
| ↓ |
| Write Data Register back to memory. |

Chart 1 lists the sequence of operations for a standard memory such as shown in FIGURE 2. The word in Main Memory 2 is addressed by the value placed in the Memory Address Register 4. The Y portion of this address controls the Y drivers 8, and the X portion of this address controls the X drivers 10. During the "read" portion of the memory cycle, suitable control pulses are applied to lines 12 and 14 to select the word in Main Memory 2 and direct it through the amplifiers 16, gate 18, to a buffer Memory Data Register 6. A suitable pulse is applied to line 20 at the proper time in order to enable the gate 18 to pass the data to the Data Register 6.

If the memory access is a "read" access, a pulse applied to line 22 enables the gates 24 to put the contents of the Memory Data Register 6 onto the Data Output Lines 26, after which the contents of Memory Data Register 6 are written back in Main Memory 2 by again operating the X and Y drivers 10 and 8, respectively, at the same time that a control pulse is applied to line 28 to enable Inhibit Drivers 30. In this manner, the contents of the Data Register 6 are written back in Main Memory 2 at the same location from which it was read.

If the memory access is a "write" access, then the contents of the Memory Data Register 6 are changed after the "read" portion of the memory cycle is terminated by pulsing the line 32 to enable gates 34 so as to allow the input data on lines 36 to be loaded into the Data Register 6. In the "write" portion of the memory cycle which follows, this new data word is written into the Main Memory 2 at the location specified by the Memory Address Register 4.

PROPOSED MEMORY—CHART 2

Read Access

Read main memory word into main Data Register.
↓
Test for presence of error indicator.

| Indicator | No indicator |
|---|---|
| ↓ | ↓ |
| Read auxiliary memory word into Auxiliary Data Register. | Gate Main Data Register to Output Lines. |
| ↓ | ↓ |
| Gate proper characters from Main and Auxiliary Data Register to Output Lines. | Write Main Data Register back to memory. |
| ↓ | |
| Write Main Data Register back to Main Memory and write Auxiliary Data Register back to Auxiliary Memory. | |

PROPOSED MEMORY—CHART 3

Write Access

Read Main Memory Word into Main Data Register.
↓
Test for presence of error indicator.

| Indicator | No indicator |
|---|---|
| ↓ | ↓ |
| Read auxiliary memory word into Auxiliary Data Register. | Gate Input Data to Main Data Register |
| ↓ | ↓ |
| Gate proper characters from Input Lines to the Main and Auxiliary Data Registers. | Write Main Data Register back to memory. |
| ↓ | |
| Write Main Data Register back to Main Memory and write Auxiliary Data Register back to Auxiliary Memory. | |

In the proposed error correcting memory to be described the "read" portion of the memory cycle is separated from the "write" portion so that the "write" portion can immediately follow the "read" portion only if there are no bad characters present in the memory word. A test is made near the end of the "read" portion for the presence of either a right indicator $I_R$ or a left indicator $I_L$. If no indicator is present, the normal "write" portion of the memory cycle follows. If an indicator is present, the normal memory cycle is interrupted at the end of the "read" portion and branches to an intermediate routine during which the Auxiliary Memory (not shown) is brought into play. During this intermediate routine, the word in the Data Register 6 is further examined to determine if the indicator is an $I_R$ or an $I_L$, and to determine whether one or two bad characters are present. This is done by an association operation on all eight characters of the word in the Main Data Register 6 and match indicators used in conjunction with the associated circuits will indicate the position of the indicator. In this manner, the conditions B through P inclusive of FIGURE 1 can be determined.

During this intermediate routine, as will be explained later, the Auxiliary Memory, which is substantially the same as that shown in FIGURE 2, goes through a conventional memory cycle, the first portion of which is a "read" portion and the second portion of which is a "write" portion. Before the Auxiliary Memory can execute its normal memory cycle, it is necessary to load the Memory Address Register of the Auxiliary Memory. This is done by gating the proper two characters of the Main Memory word to the Memory Address Register of the Auxiliary Memory and an examination of FIGURE 1 will show that the location of these two address characters varies according to the location of the bad characters. The Auxiliary Memory can then execute the "read" portion of its memory cycle during which time special gates will be conditioned in order to direct the proper characters from the Main and Auxiliary Data Registers to the output lines in the case of a "read" memory access, or from the input lines to the Main Memory and Auxiliary Memory Data Registers in the case of a "write" memory access. In other words, upon detection of an error indicator, the proper address of the Auxiliary Memory must be accessed and special gate controls set up to direct the flow of data, as part of it must go to or from the Main Memory Data Register 6 and the other part of the data must go to or from the Auxiliary Data Register 6A, shown in FIGURE 7. These operations will be described in more detail hereinafter.

Reference is now made to Chart 2 which is a chart showing the sequence of operations during a 'read" access used for this invention and to Chart 3 which shows the sequence of operations during a "write" access for this invention. FIGURE 3 is a block diagram which shows how the sequence of operations listed in Charts 2 and 3 is carried out.

Referring to FIGURE 3, a request for memory access results in line 38 becoming active. This starts the Pulse Generator #1, denoted by the reference character 40, said Pulse Generator #1 supplying the pulses necessary for the "read" portion of the Main Memory cycle and for the Association Circuits 43 and 45 which detect the presence of an error indicator. The various controls for the Main Memory 2, such as shown in FIGURE 2, are indicated by the line 42 coming out of the bottom of Pulse Generator 40. The line 44 emanating from the first Pulse Generator 40 tests for the presence of an error indicator. If there is no error indicator, line 46 will become active, conditioning gate 48 so that, at the end of its cycle, Pulse Generator 40 will emit a pulse on line 50 which will pass through the gate 48 via line 52 to trigger a second Pulse Generator 54 into operation. The second Pulse Generator 54 will supply the normal pulses for the "write" portion of a Main Memory cycle and the Main Memory 2 will operate in the manner described in FIGURE 2. If an indicator $I_L$ or $I_R$ is present, an output signal will exist on line 56 and travel on line 58 to enable gate 60 so that when the pulse exits on line 50, such pulse will extend through the gate 60 to start the third Pulse Generator 62. The active condition of line 56 also extends via line 64 to the special input-output gate selection circuits denoted by the reference character 66. As mentioned previously, the block 66 also contains the circuits which select, from the word in the Main Data Register 6, the address of the word in the Auxiliary Memory and apply this address to the Memory Address Register (similar to Memory Address Register 4 of the Main Memory) of the Auxiliary Memory. The Pulse Generator 62 then supplies pulses on line 68 for the "read" portion of the Auxiliary Memory cycle carried out by circuitry contained in the box labeled 69. A pulse is emitted on line 70 which extends to Pulse Generator 54 so that the input-output gate control circuits during such "read" access for both the Auxiliary Memory and the Main Memory 2 operate concurrently. In other words, the line 72 carries a timing pulse for the special gates included in the circuitry shown in box 71 which were set up by circuits in block 66, such timing pulse appearing in proper timed fashion with a pulse on line 74 which would control the input-output gates, whose circuitry is in box 73, during a normal memory cycle. The controls on line 76 provide the "write" access of the Auxiliary Memory cycle, whose circuitry is contained in box 75, and these occur concurrently with controls on line 78 which control the "write" portion of the Main Memory cycle, whose circuitry is contained in box 77.

Reference can next be made to FIGURES 4*a* and 4*b* which show a detailed block diagram of the Main Memory Data Register designated by the number 6 in FIGURE 2. The boxes labeled 80 and 82 are registers for the first and eight character positions and are shown in more detail in FIGURE 5. The boxes 84, 86, 88, 90, 92 and 94 denote the character positions 2 through 7, inclusive, of a memory word and are shown in more detail in FIGURE 6. As each character position contains 8 bits, each character position has eight identical flip-flops 81 (see FIGURE 5) and thus there are 16 input lines and 16 output lines associated with each character position. A cable 96 extends to the gate 18 shown in FIGURE 2 and also carries 128 leads, 16 leads for each register 80, 82, 84 . . . 94. Cable 96 carries the word read out of Main Memory 2 into the Data Register 6. The cable denoted by the reference character 98 extends to the Data Input gates 34 (all the gate circuitry shown in FIGURES 8, 9, 10 and 11) and carries data to Data Register 6 during a "write" access. Cable 98 is also labeled at the top of FIGURES 4*a* and 4*b* as MDI 1, MDI 2 . . . MDI 8, and such labelings stand for Main Data Input 1, Main Data Input 2, etc., signifying information being placed into the Main Data Register 6 prior to a "write" access into Main Memory 2. Similar labelings abbreviated M.D.O. at the bottom of FIGURES 4*b* and 4*c* stand for Main Data Output #1, Main Data Output #2, etc. Cable 118 carries such data from Main Data Register 6 to Data Output gates 24 (all the gates shown in FIGURES 12, 13, 14 and 15). It will be noted that two wires 83 and 85 are brought out from each high order flip-flop 81 in the positions 2 through 8, inclusive and each such pair of wires 83 and 85 make up the cable 100. These wires are used to determine whether the high order bit of the Y address is a "0" or a "1" in that a "0" state indicates one bad character exists in the Main Memory 2 and a "1" indicates the presence of two adjacent bad characters in Main Memory 2.

Reference to FIGURE 1 shows that the Y address can only exist in character positions 2 through 7, inclusive. The cable denoted by the reference character 102 extends to gating circuits which apply the proper pair of characters 2 through 8 to the Memory Address Register of the Auxiliary Memory. Reference to FIGURE 1 will show that Auxiliary Memory addresses can only exist in character positions 2 through 8. The cable denoted by the reference character 104 extends to the inhibit drivers 30 shown in FIGURE 2.

Reference is now made to FIGURE 7 which shows in detail an Auxiliary Memory Data Register 6A. This data register is similar to the Main Memory Data Register 6 shown in FIGURE 2. Five characters are shown by the reference characters 106, 108, 110, 112 and 114. Each character position is composed of eight flip-flops and is similar to a character such as characters 80, 82, 84, etc. of FIGURES 4*a* and 4*b*. While five character positions are shown, it must be remembered that only four are necessary in the case of a single bad character and the fifth is used only in the case of two bad adjacent characters. Cable 98A is the equivalent of cable 98 serving the Main Memory 2, but the word appearing on Data Input cable 36 will, after passing through gating circuitry 34, be diverted, some of the characters of such word going along cable 98A to the Main Data Register 6 and other characters of such word going along cable 98A to the Auxiliary Memory Data Register 6A. The cables labeled ADI 1, ADI 2 . . . ADI 5 represent Auxiliary Data Input and signify those characters that will be employed to substitute for the four or five characters of the Main Memory Word that are not useable as data characters when one or two characters of such Main Memory Word are bad. ADO 1, ADO 2 . . . ADO 5 are the Auxiliary Data Outputs that appear on cable 118A and, as seen in FIGURE 2, cable 118A feeds into gate circuitry 24. Cables 118 and 118A carry various combinations of Main Data Output signals and Auxiliary Data Output signals to actuate the various circuits of FIGURES 12 to 15 so as to produce a corrected word output on Data Output cable 26. Cable 96A comes from the sense amplifiers of the Auxiliary Memory and serves the same function in the Auxiliary Memory Read-Write cycle as cable 96 serves in the Main Memory cycle. Likewise, cable 104A connects the Auxiliary Data Output lines of Auxiliary Memory Data Register 6A to the Inhibit Drivers of the Auxiliary Memory, duplicating the function of cable 104 in the Main Memory cycle.

Referring to FIGURES 4 and 6, it is seen that the cable 120 is used for association purposes. The lines 122, 124, 126, 128, 130 and 132 of FIGURES 4*a* and 4*b* extend to match indicators 134, 136, 138, 140, 142 and 144, shown in FIGURE 4*d*. These match indicators, 134 through 144 inclusive, indicate the possible position of an error character and reference to FIGURE 1 will show that an error indicator $I_L$ or $I_R$ can only exist in character positions 2 through 7, inclusive. Therefore, the match indicator 134 relates to character position 2 and the match indicator 144 relates to character position 7. At the start of an association operation, a pulse is first applied to line 146 (see FIGURE 4*d*) to set all match indicators to their respective "1" states. A pulse is then applied to line 148 (FIGURE 4*c*) which gates "1's" through cable 120 to the seven high order positions of each character 2 to 8, so that the corresponding seven high order bits of each character 2 to 8 are interrogated for "1's". It will be remembered that both indicators $I_R$ and $I_L$ have "1's" in the seven high order bit positions. Consequently, this association operation will detect whether there is an indicator present but will not indicate whether it is an $I_R$ or an $I_L$. If there is no indicator present, namely, a bit equal to 1111111X, all match indicators 134 through 144, inclusive, will be set to "0" from signals coming from a mismatch line 122, 124, 126 . . . 132 (see FIGURE 6) and the AND circuit 150 will have an output on line 152 which is an indication that no indicator has been found. As is seen in FIGURE 6, if any flip-flop 81 of a character, such as character 84, is in its "0" state, then a signal will appear on its associated mismatch line, for example, line 122 for character 84. For example, if AND circuit P of the second order bit of character 84 of FIGURE 6 is actuated by the "0" state of its flip-flop 81 and the "1" state of the interrogating pulse appearing on line Q, then a mismatch signal appears on line 122. A pulse then applied to line 154 will extend through the AND circuit 156 and appear on line 158 which is in the box 43 and extends to line 46, shown in FIGURE 3, and will be effective to permit Pulse Generator 54, also shown in FIGURE 3, to be operative. The line 154 also extends to the gate 178 and a pulse on line 154 is effective to transfer the setting of the match indicators from the flip-flops 134 to 144, inclusive, to the flip-flops 180, 182, 184, 186, 188 and 190. If there has been no match indication, such pulse on line 154 applied to gate 178 merely transfers all "0's" to flip-flops 180 to 189. The flip-flops 180 to 190, inclusive thus will store the character position of the indicator for the rest of the memory cycle. It is necessary to make this transfer because the flip-flops 134 to 144 are used a second time to determine which indicator, $I_R$ or $I_L$, is present. In this manner, a normal memory cycle will occur if no error indicator is sensed.

If either an $I_R$ or an $I_L$ were present in the Main Data Register 6, then one of the indicators 134 through 144 would be left in its "1" state following the association operation so that AND circuit 150 would not be satisfied and no output would appear on line 152. Under these circumstances, the inverter 160 would produce an output to enable the gate 162 and, when a pulse is applied to line 154, such pulse would extend through AND circuit 162 and appear on line 164 which extends to line 58 in FIGURE 3 and is effective to start the Pulse Generator 62. The pulse on line 164 sets flip-flop 166 to its "1" state which indicates that an indicator has been found. It could be mentioned at this point that if no indicator were found and a pulse appeared on line 158, this same pulse would set flip-flop 166 to its "0" state, and this in turn would be effective to cause the normal input-output gate control shown in FIGURE 3, to which line 74 extends, to be operative. When flip-flop 166 is set to its "1" state, then the normal input-output gate control in box 66 in FIGURE 3 is inhibited and the special input-output gate control circuits 71, to which the line 72 extends, are enabled.

The events up to this time have resulted in the information that either an error indicator is present or is not present. If an error indicator is present, it is still necessary to determine whether or not it is an $I_R$ or an $I_L$. This is done by a second association on the low order bit only of each of the positions 2 through 7, inclusive, of the Main Memory Data Register 6. This second association operation is accomplished as follows: A pulse emanating from circuitry 66 (FIGURE 3) is applied to line 168 of FIGURE 4*c* which gates a "1" to the association lines for the lowest order bit positions of each of the characters 2 through 7. If this second association fails, all match indicators 134 through 144, inclusive, will now be set to "0" and the AND circuit 150 will again be satisfied and an output will appear on line 152 which will be effective to enable AND circuit 170. If a pulse is now applied to line 172, it will extend through AND circuit 170 and set flip-flop 174 to its "0" state which will indicate that the indicator found on the first association operation is an $I_R$. It has previously been mentioned and shown in FIGURE 1 that an $I_R$ has a "0" bit in its low order position. If the second association operation succeeds, then one of the match indicators 134 through 144 would be left in its "1" state and the AND circuit 150 would have no output. The inverter 160 would then be actuated to produce an output to enable AND circuit 176 and the pulse applied to line 172 would extend through it and set flip-flop 174 to its "1" state, which would indicate that the indicator present is an $I_L$. The circuits described up to this point cover the detection of an error indicator, the position in which the error indicator is located, and whether the indicator is an $I_R$ or an $I_L$. A description will now follow of how the number of bad characters are determined and, with this information, it will be possible to set up the special gating circuits in box 71 of FIGURE 3 to take care of gating a portion of the memory word to or from the Main Data Register 6 and the remainder of the data word to or from the Auxiliary Data Register.

Referring to FIGURE 4*d*, the position of the indicator, namely, whether it is the 2nd, 3rd . . . or 7th character of a Main Memory Word, is stored as the "1" state of one of the flip-flops 180 to 190. The type of indicator $I_R$ or $I_L$ is stored in flip-flop 174. By combining this information, using the AND circuits 179, 181, 183, 187 and 189 and the OR circuits 191, 193 and 195, it is possible to select the pair of lines from the group of pairs denoted by the reference character 100 and see whether the selected pair represents a "1" or a "0." Looking at the high order bit of the Y address in Main Memory, it will be remembered that the lines 100 come from the highest order bit position of the character positions 2 through 7, inclusive. One of the gates, 196 to 206, directs this high order bit information to the OR circuits 208 and 210, (see FIG. 4*c*), the output of which is effective to set the flip-flop 212. If this flip-flop 212 is set to its "1" state, it indicates that there are two adjacent bad characters in a Main Memory Word. If flip-flop 212 is set to its "0" state, it indicates that there is one bad character. The functions generated by the AND circuits 179 to 189, inclusive, and flip-flop 174 are also used as inputs to the AND circuits 214 to 236, inclusive, which are controlled by the output of flip-flop 212. In this way, the conditions B through P, inclusive, can be determined. It will be noted that condition A is determined directly by the "0" state of flip-flop 166, and line 213 leads to the A condition (see FIGURE 1) selector.

If FIGURES 4*a*, 4*b*, 4*c*, 4*d* and 4*e* are arranged as shown in block form in FIGURE 4, it will be noted that the functions generated by AND circuits 179 to 189 and flip-flop 174 extended via wires 238 to be used as controls for gates 240 to 250, inclusive. The inputs to these gates 240 to 250 appear on cable 102 and are the characters 2 through 8, inclusive of the Main Memory Data Register 6 shown in FIGURES 4*a* and 4*b*. The purpose of the gates 240 to 250 is to select the proper pair of character positions in the Main Memory Data Register 6 which contain the address which must be accessed in the Auxiliary Memory. Consequently, the outputs of gates 240 to 250, inclusive, are merged and extend to the Auxiliary Memory Address Register.

Figure 12:
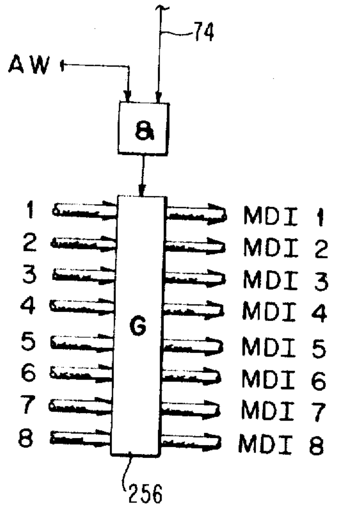
Figure 13:
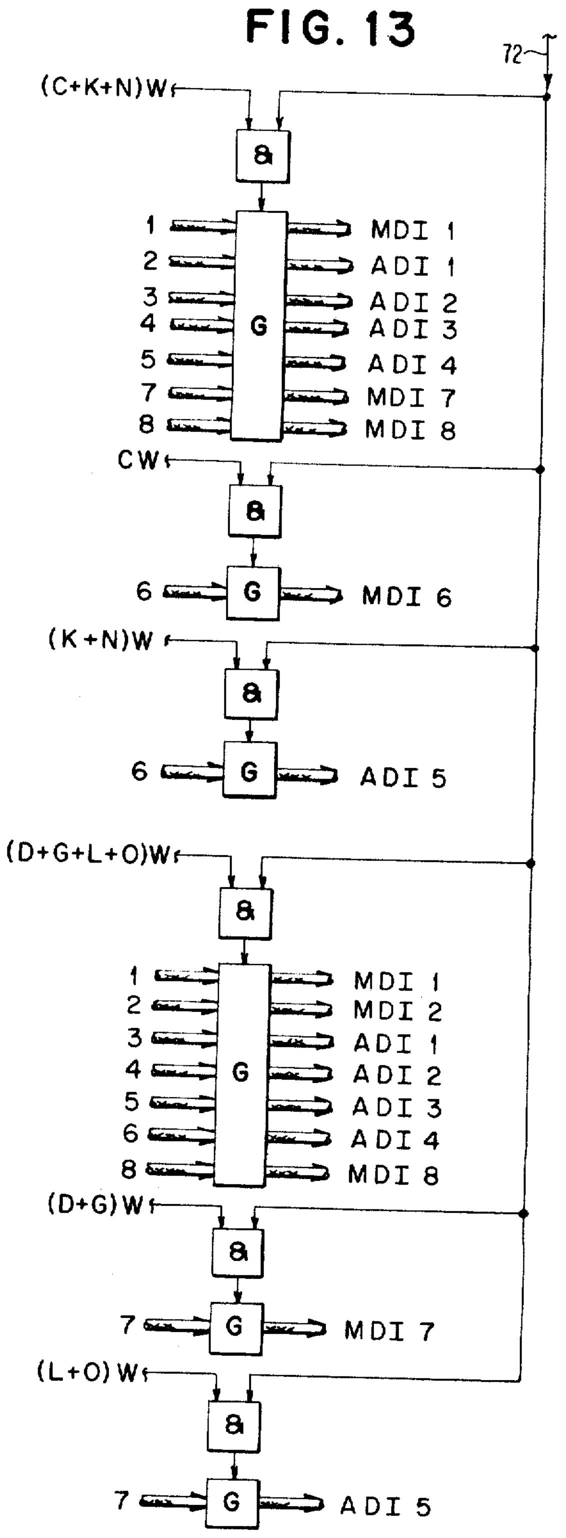
Figure 14:
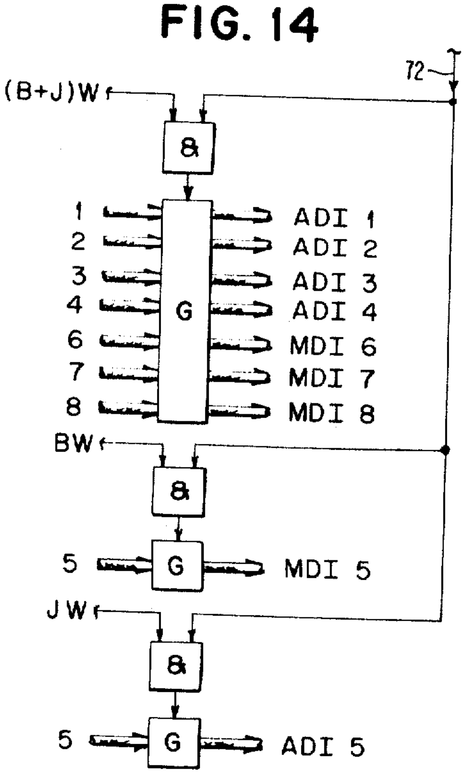

Referring to FIGURE 4*e*, the lines A to P, inclusive, appear at the left of the drawing. Additional inputs to two strings of AND gates 300 and 302 shown in FIGURE 4*e* are the Read Access and Write Access lines which are the same as those shown in FIGURE 3. It is obvious how the functions listed at the right of FIGURE 4*e* are generated by the logic shown. The outputs of gates 300 and 302 extend to FIGURES 8 through 15 and are used to select the proper input and output gates shown in the latter figures which are used during the Read Access or during the Write Access. For example, referring to FIGURE 8, the gate 252 is the gate which must be enabled if no bad characters are involved during a Read Access. It will be noted that there is an AND gate 254 associated with gate 252. One input to gate 254 is a signal on line 74 and the other input to such gate is a signal on line AR. Gate 252 would be used to gate the contents of the Main Memory Data Register 6 to the output lines during a normal Read Access. The gate which would be used during a normal Write Access is shown in FIGURE 12 by the reference character 256. The remainder of the gates shown in FIGURES 9, 10, 11, 13, 14 and 15 are selected by the outputs shown in FIGURE 4*e* and are conditioned by pulses on the line 72. Each gate, such as gate 252, 256, or their equivalents, has, as inputs, cables which refer to character positions of either the Main Memory Data Register 6 or the Auxiliary Memory Data Register 6A which is similar in function to Main Memory Data Register 6 but is part of the Auxiliary Memory system. For example, the abbreviation M.D.O. refers to Main Memory Data Output and corresponds to the same abbreviation shown in FIGURES 4*a* and 4*b*. The abbreviation A.D.O. means Auxiliary Memory Data Output and corresponds to the same notation found in FIGURE 7. The abbreviation A.D.I. refers to Auxiliary Memory Data Input and corresponds to the same notation in FIGURE 7. The Data Output cable 26 shown in FIGURE 2 would carry information either from Main Memory or Auxiliary Memory, or from both memories during a Read Access, whereas the cable 36 would, during a Write Access, switch input data from Data Input lines to the Main and Auxiliary Memory Registers. Each cable, 26 and 36, would be broken up into individual cables of sixteen conductors so that each individual cable will be capable of carrying a binary character eight bits long.

Assume for the sake of illustration, that the second character of a given word in Main Memory Data Register 6 is bad because one or more bits forming that character is permanently unswitchable or otherwise defective. Before that word can be transferred from the Main Memory Data Register 6 as useable data output, detection must be made of the error so that the Auxiliary Memory can substitute enough good characters to replace not only the bad character(s) of the Main Memory word but also that character ($I_L$ or $I_R$) needed to indicate such bad character as well as those characters needed to address the location of good characters in the Auxiliary Memory.

As can be seen in FIGURE 1, when only the second character of an eight character word in the Main Memory 2 is bad, then condition C exists and the correction scheme should indicate an indicator $I_R$ located to the right of the bad character and that the Y address and X address are located in the fourth and fifth characters, respectively, of the bad word in Main Memory 2. After all the match indicators 134 through 144 have been set to their respective "1" states by a pulse on line 146 (FIGURE 4*d*), a test during the "read" portion of the Main Memory cycle for the presence of either an $I_R$ or an $I_L$ indicator is made. In the example chosen, box 86 of the Main Memory Data Register 6 is housing the character 11111110 because that is the code for a right indicator $I_R$. The second match indicator 136 will not have a mismatch signal on its input line 124 so its associated flip-flop will be maintained in its "1" state, and thus match indicator 136 will not send a signal to AND circuit 150. The failure of AND circuit 150 to produce a pulse on line 152 will cause inverter 160 to become actuated and condition AND circuits 162 and 176. A signal pulse on line 154 passes through gate 162 to set flip-flop 166 to its "1" state to store the fact that an indicator was detected and also appears on line 58 of FIGURE 3 and to start pulse generator 62. By setting flip-flop 166 to its "1" state, the normal input-output gate selection circuits in box 66 of FIGURE 3 are inhibited and the special input-output gate control circuits 71 to which line 72 extends are enabled.

Once an indicator has been found, which sets off a chain of events to actuate the special input-output gate control circuits 71, a pulse emanating from either box 66 or 71 is applied to line 168 of FIGURE 4*c* so as to gate a "1" to the association lines for the lowest order bit position of each of the characters 2 to 7. The second association will show a mismatch because the indicator is an $I_R$, which exists because of the present assumption that condition C of FIGURE 1 exists, so that flip-flop 136 is set to its "0" state, making all flip-flops 134 to 144 set to their respective "0" states. AND circuit 150 is actuated, producing an output on line 152, conditioning AND circuits 156 and 170.

Now, when a pulse is applied to line 172, such pulse passes through AND circuit 170 to set flip-flop 174 to its "0" state, such "0" state indicating that a right indicator exists. Since flip-flop 182 was in its "1" state prior to the application of a pulse on line 172, having been set to that state by the previous pulse on line 154, AND gates 214 and 216 are conditioned by the "1" state of flip-flop 182 and current traverses OR circuit 193. Current traversing OR gate 193 appears on line 193*a* and conditions gate 200, the latter being actuated by the "0" input of the highest order bit of the Y address. This is so because, as seen in FIGURE 1, a single bad character is designated by a "0" in the highest order bit of the Y address character.

Figure 10:
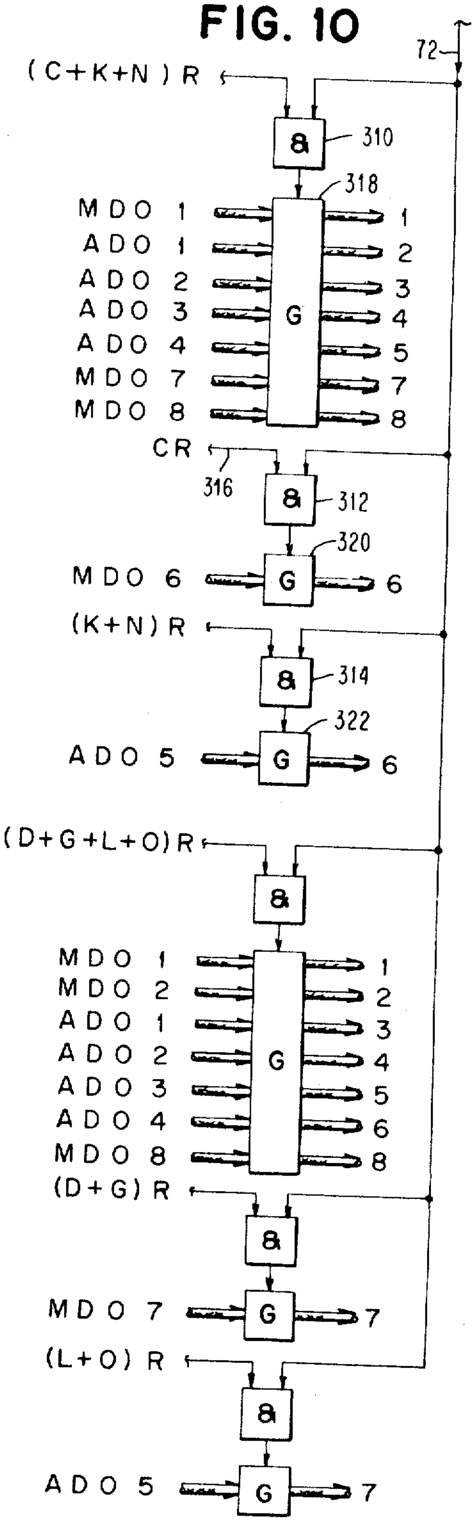
Figure 11:
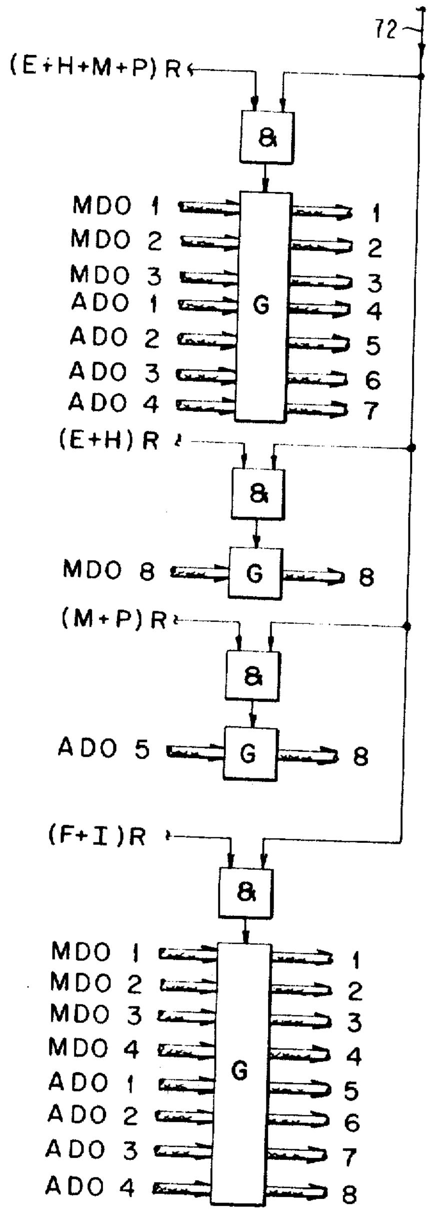
Figure 15:
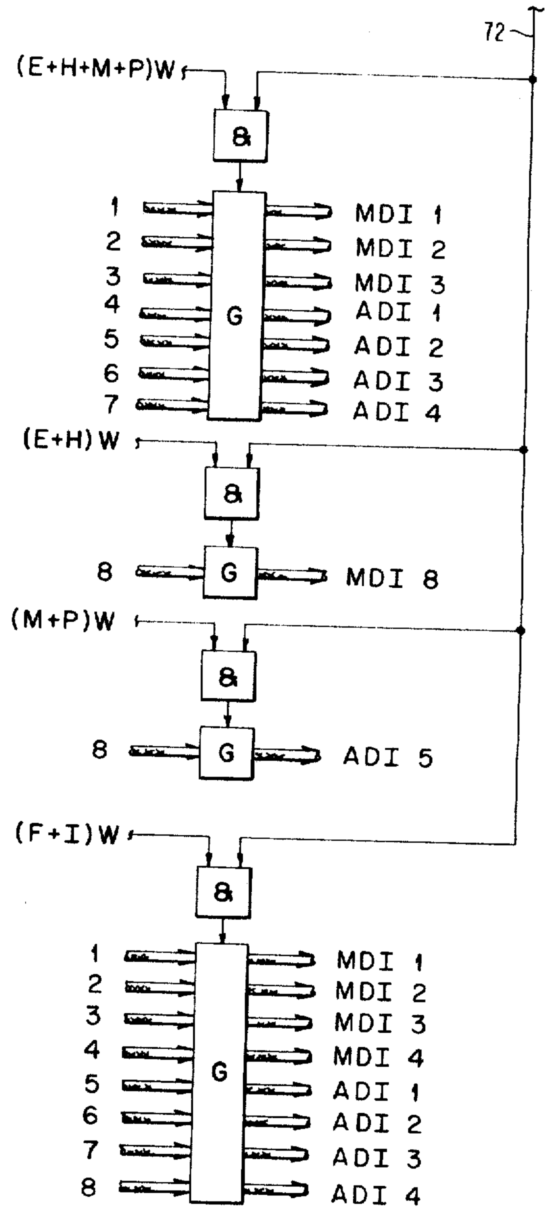

An output appears on line 200*a*, of gate 200, actuating OR circuit 210, resulting in current appearing on line 210*a*, setting flip-flop 212 to its "0" state, such current continuing on line 212*a*. Output current on line 212*a* conditions gate 214 as well as gates 218, 222, 226, 230 and 234; but AND gates 214 and 216 are conditioned by current on line 182*b*, coming from the "1" output of flip-flop 182. Thus, AND gate 214 is actuated by the joint inputs on line 182*b* and line 212*a* so that line C is made active. As is seen in FIGURE 4, the active C line will transmit current on line 301 through its associated OR gate 303. For a "Read" operation, when a bad character(s) has been detected, AND gate 300*a* is actuated, whereas for a "Write" operation that involves the presence of a bad character(s), AND gate 302*a* is actuated. Assuming a "Read" operation, a signal appears on line 308 to actuate a gate that will read out a portion of the selected word from the Main Memory 2 and another portion of the selected word from the Auxiliary Memory. As seen in FIGURE 10, output signal $(C+K+N)R$ actuates AND gate 310 and the signal CR actuates AND gate 312. It is to be noted that the logic must allow for the correction of a single bad character or for the correction of two adjacent bad characters.

When a signal on line 72 is applied, it conditions all the AND gates similar to gates 310, 312, 314, etc. of the input-output control gates found in the circuitry shown as box 71. In the example selected, there is only one bad character, so gate 312 is conditioned by a pulse on the line 316 marked CR, whereas gate 314 is not conditioned by a signal on the line $(K+N)R$. It is noted that the output of gate 318 will be a word composed of a first character (M.D.O. #1) from Main Memory, the second, third, fourth and fifth characters (A.D.O. #1, A.D.O #2, A.D.O. #3, and A.D.O. #4) from the Auxiliary Memory, and the sixth, seventh and eighth characters (M.D.O. #6, M.D.O. #7, and M.D.O. #8) from Main Memory 2. It is seen that gates 320 and 322 supply the sixth character for the corrected word in accordance with the detection of a single bad character or two adjacent bad characters; gate 320 is actuated to obtain a character from Main Memory to supply the sixth character of the corrected word when condition C of FIGURE 1 exists and gate 322 is actuated to produce the sixth character of the corrected word from the Auxiliary Memory when condition K of FIGURE 1 exists. The various gates and switching of output data shown in FIGURES 8, 9, 10 and 11 supply corrective characters from an Auxiliary Memory intertwined with uncorrected characters from Main Memory during a "read" access and FIGURES 12, 13, 14 and 15 show various gates and switching of input data to supply corrective characters from an Auxiliary Memory intertwined with uncorrected characters from the Main Memory during a "write" access. What combinations of Main Memory characters and Auxiliary Memory characters are needed are determined by the logic shown mainly in FIGURES 4 and 8 to 15.

The above described system makes it possible to use a memory that contains unswitchable defective storage locations without replacing the entire word that contains the defective bad bits or bit. The bad memory word can be replaced with a corrected word without adding materially to the normal read/write memory cycle time of the computer. The invention will have particular application to memories manufactured by batch manufacturing techniques wherein a certain percentage of uncorrectable bits will exist in the completed memory, but it would not be economical to discard the entire memory so fabricated.

While the invention has been particularly shown and described with reference to preferred embodiments thereof, it will be understood by those skilled in the art that various changes in form and details may be made therein without departing from the spirit and scope of the invention.

What is claimed is:

1. A memory system including a main memory storing a plurality of multibit word registers composed of binary characters wherein the binary bits forming one of said binary characters are permanently defective.

an auxiliary memory having pretested word registers of highest reliability, means for indicating the presence of any permanently defective bit position within a character of a word register in main memory, said indicating means comprising a binary character formed of a fixed array of bits located within the word register adjacent that binary character that includes the defective bits, means for also storing within said defective register, in the form of binary characters, the address in said auxiliary memory of substitutable characters that are needed to replace the bad character, indicating character and address characters of said partially defective word register in main memory, means for detecting the presence of said partially defective register during the attempted readout from main memory of said partially defective register, and means for simultaneously gating out the substitutable characters in the auxiliary memory with the uncorrected characters in the partially defective word register.

2. A memory system including a main memory storing a plurality of multibit word registers composed of binary characters wherein the bits forming some of said binary characters are permanently defective, an auxiliary memory having pretested word registers of highest reliability, means for indicating the presence of any permanently defective bit positions within a character of a word register in main memory, said indicating means comprising a binary character formed of a fixed array of a fixed array of bits located within the word register and located adjacent said character containing permanently bad bits, means for also storing within said partially defective register, in the form of binary characters, the address in said auxiliary memory of substitutable characters that are needed to replace the bad character, indicating character and address characters of said partially defective memory word, a data register for storing the partially defective memory register during the process of addressing said defective registers in main memory, means for detecting the presence of said main memory's partially defective register, means responsive to said detection for reading out said substitutable characters from said auxiliary memory to said auxiliary data register, and means for simultaneously reading out the contents of both data registers so that the substitutable characters within said auxiliary data register combine with the uncorrected characters in said data register to produce a corrected memory word register.

3. In a data handling device, the combination of a main memory which includes a plurality of multibit memory registers for storing information words, such words being composed of a plurality of multibit characters and a predetermined number of such information words contain at least one character having permanently defective bit positions, an auxiliary memory, each such defective-character-bearing word containing an indicator character and address characters, said indicator character containing a binary code for identifying the presence of a defective character and said address characters containing the address in said auxiliary memory of correct characters substitutable for the permanently defective character, indicator character and address characters of the defective register in main memory, memory input-output means for selectively addressing and reading into or out of any one of said main memory registers, first means for detecting the presence of said indicator character during such selective addressing, second means for carrying out the normal reading into or out of main memory said selectively addressed main memory word if there is no detection of the presence of said indicator character, and third means for simultaneously performing the reading out of the uncorrected characters of the defective word register of the main memory and the substitutable characters of the auxiliary memory register when there is a detection of said indicator character.

4. A memory system including a main memory storing a plurality of multibit word registers composed of binary characters wherein the binary bits forming one of said binary characters are permanently defective, an auxiliary memory having pretested word registers of highest reliability, means for indicating the presence of any permanently defective bit positions within a character of a word register in main memory, said indicating means comprising a binary character formed of a fixed array of bits located within the word register adjacent that binary character that includes the defective bits, means for also storing within said partially defective register, in the form of binary characters, the address in said auxiliary memory of substitutable characters that are needed to replace the bad character, indicating character and address characters of said partially defective word register in main memory, means for detecting the presence of said partially defective register during the attempted writing into main memory of said partially defective register, and means for simultaneously gating out the substitutable characters in the auxiliary memory with the uncorrected characters in the partially defective word register.

References Cited

UNITED STATES PATENTS

| | | | |
|---|---|---|---|
| 3,222,653 | 12/1965 | Rice | 340—172.5 |
| 3,234,521 | 2/1966 | Weisbecker | 340—172.5 |
| 3,245,049 | 4/1966 | Sakalay | 340—172.5 |
| 3,264,615 | 8/1966 | Case et al. | 340—172.5 |
| 3,317,898 | 5/1967 | Hellerman | 340—172.5 |

ROBERT C. BAILEY, *Primary Examiner.*

K. MILDE, *Assistant Examiner.*